United States Patent
Koyanagi

(10) Patent No.: US 7,065,135 B2
(45) Date of Patent: Jun. 20, 2006

(54) SYSTEM AND METHOD FOR EQUALIZING HIGH-SPEED DATA TRANSMISSION

(75) Inventor: Yoichi Koyanagi, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 10/870,019

(22) Filed: Jun. 16, 2004

(65) Prior Publication Data

US 2005/0281097 A1    Dec. 22, 2005

(51) Int. Cl.
*H03K 1/159* (2006.01)
(52) U.S. Cl. .................................................... 375/229
(58) Field of Classification Search ................ 375/229, 375/257, 285, 295, 296, 346; 333/18, 28 R; 708/300, 301, 319, 322, 323; 327/108
See application file for complete search history.

(56) References Cited

U.S. PATENT DOCUMENTS

| | | | |
|---|---|---|---|
| 6,680,681 B1 * | 1/2004 | Hsu et al. ................ | 341/144 |
| 2004/0008059 A1 * | 1/2004 | Chen et al. ............... | 327/112 |
| 2004/0022311 A1 * | 2/2004 | Zerbe et al. .............. | 375/229 |
| 2005/0111585 A1 * | 5/2005 | Stojanovic et al. ........ | 375/316 |
| 2005/0149659 A1 * | 7/2005 | Horowitz et al. .......... | 710/305 |

OTHER PUBLICATIONS

Zerbe et al., "Equalization and Clock Recovery for a 2.5-10Gb/s 2-PAM/4-PAM Backplane Transceiver Cell," 2003 IEEE International Solid-State Circuits Conference, 10 pages, 2003.

* cited by examiner

*Primary Examiner*—Don N. Vo
(74) *Attorney, Agent, or Firm*—Baker Botts L.L.P.

(57) ABSTRACT

According to one embodiment of the present invention, a method for equalizing a signal includes introducing a delay into an incoming data signal to generate a first delayed signal of a first format. A plurality of drivers operable to receive the incoming signal and the first delayed signal are identified. Each of the plurality of drivers have an associated drive strength. A first driver is selected from the plurality of drivers to receive the incoming signal. The selection is based at least in part on a comparison of the drive strength associated with the first driver to a maximum output current of the first driver. A second driver is selected from the plurality of drivers to receive the first delayed signal. The selection is based at least in part on a comparison of the drive strength associated with the second driver to a maximum output current of the second driver. The incoming signal is directed to the first driver, and the first delayed signal is directed to the second driver.

32 Claims, 3 Drawing Sheets

SYSTEM AND METHOD FOR EQUALIZING HIGH-SPEED DATA TRANSMISSION

TECHNICAL FIELD OF THE INVENTION

This invention relates generally to the field of data communication and more specifically to equalizing a signal for high-speed data transmission.

BACKGROUND OF THE INVENTION

A high-speed signal transmitted from a transmitter to a receiver typically experiences distortion. To compensate for expected distortion, the transmitter may equalize the signal using a multi-tap equalizing filter. For example, the transmitter may include a Finite Impulse Response (FIR) filter. Typically the FIR filter may include the conversion of the parallel input data into a single high-speed serial data stream. FIR filter may also include multiple delay elements and a number of large-scale drivers for converting the serial data to the analog output current and generating a weighted sum of the multiple delayed versions of the serial data stream.

Because large-scale drivers for each tap are typically designed to handle one hundred percent of the estimated output current of the high-speed signal, however, portions of each large-scale driver may not be used. Accordingly, the large-scale drivers may be over designed and inefficient. Because large-scale drivers introduce capacitance into the multiple delayed versions of the serial data stream and slow output signal transition, the performance of the equalizing filter may be degraded. This performance degradation becomes more significant for filters with a large number of taps which must compensate for a large amount of distortion. Accordingly, known techniques for equalizing a signal may be unsatisfactory in certain situations.

SUMMARY OF THE INVENTION

In accordance with the present invention, disadvantages and problems associated with previous techniques for equalizing a signal for transmission may be reduced or eliminated.

According to one embodiment of the present invention, a method for equalizing a signal includes introducing a delay into an incoming data signal to generate a first delayed signal of a first format. A plurality of drivers operable to receive the incoming signal and the first delayed signal are identified. Each of the plurality of drivers have an associated drive strength. A first driver is selected from the plurality of drivers to receive the incoming signal. The selection is based at least in part on a comparison of the drive strength associated with the first driver to a maximum output current of the first driver. A second driver is selected from the plurality of drivers to receive the first delayed signal. The selection is based at least in part on a comparison of the drive strength associated with the second driver to a maximum output current of the second driver. The incoming signal is directed to the first driver, and the first delayed signal is directed to the second driver.

Certain embodiments of the invention may provide one or more technical advantages. A technical advantage of one embodiment may be that the equalizing filter utilizes an array of drivers that are individually sized according to the requirements of the equalizing filter. For example, a switch may be used to route signals to appropriately-sized drivers. Another technical advantage may be that each driver is configured to handle an appropriate percentages of the estimated output current required of the equalizing filter. As a result, each driver may be used at or near its capacity, and large portions of the drivers may not go unused. Another technical advantage may be that the introduction of capacitance into the signals may be reduced. Accordingly, the transmission speed of the high-speed signals may be increased, and the performance of the equalizing filter may be improved.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
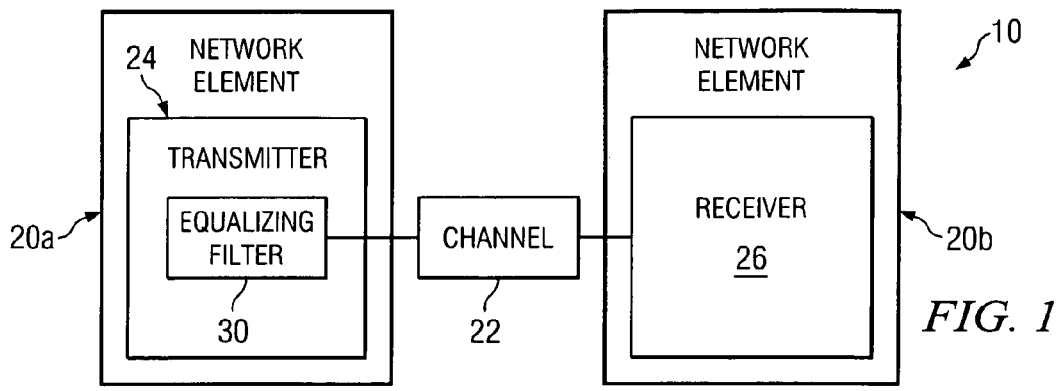
FIG. 1 illustrates one embodiment of a network for the efficient equalizing of data signals for transmission.

FIG. 1 illustrates one embodiment of a network for the efficient equalizing of data signals for transmission. A transmitter 24 includes an equalizing filter 30 that introduces a delay into an incoming signal to generate delayed signals. Equalizing filter 30 also includes transistors or other components that are individually sized to more efficiently receive and convert the incoming signal and delayed signals from a first format to a second format. A switch distributes the signals to the appropriately sized transistor. Accordingly, smaller circuit components may be utilized and capacitance may be reduced.

According to the illustrated embodiment, network 10 includes network elements 20a–b and a channel 22 coupled as shown in FIG. 1. A network element 20 may comprise an element that transmits and receives data such as a server system, a storage system, a network system, a routing system, or any combination of the proceeding. A server system may include one or more central processing units (CPUs) and one or more memory units. A storage system may include one or more channel adapters (CAs), one or more disk adapters (DAs), and one or more CPU modules (CMs). A routing system may couple network 10 to one or more other networks, which include one or more local area networks (LANs), wide area networks (WANs), or other networks.

Channel 22 may comprise a cable having a length on the order of ten to one hundred meters. In particular embodiments, channel 22 may comprise a cable having a length on the order of twenty to forty meters. For example, channel 22 may have a length of 30 meters. The speed of a signal traveling through channel 22 may be in the range of multi-gigabits per second. For example, the speed of the signal may be on the order of three gigabits per second. As an example, channel 22 may operate according to the 10 Gigabit Attachment Unit Interface (XAUI) standards, which require a fixed frequency of 3.125 gigabits and is used for 10 Gigabit Ethernet.

Signals traveling at high speeds are susceptible to distortion resulting from an impulse response of channel 22. More specifically, a received signal may suffer from frequency dependent distortion due to the skin effect and dielectric loss. Frequency dependent distortion may result in interference such as inter-symbol interference (ISI). Multi-gigabit rate communication typically requires a high degree of equalization over approximately twenty to forty dB to overcome inter-symbol interference.

Network element 20a includes a transmitter 24, and network element 20b includes a receiver 26. Transmitter 24 transmits a signal through channel 22 to receiver 26. The functions of transmitter 24 and receiver 26 may be performed using software, hardware, other logic, or any suitable combination of the preceding. In various embodiments, transmitter 24 includes an equalizing filter 30. In particular embodiments, equalizing filter 30 may include a FIR filter that adjusts the signal to be transmitted to compensate for expected distortion occurring during transmission. Known equalizing techniques include the conversion of multiple signals from a digital format to an analog format. The analog signals may be summed to result in a single high-speed output signal. Known techniques include directing the signals at an array of similarly sized drivers without considering the coefficient parameters defining the required output currents of each signal. As a result, the drivers may be oversized resulting in increased capacitance and slowed output signal transition.

Figure 2:
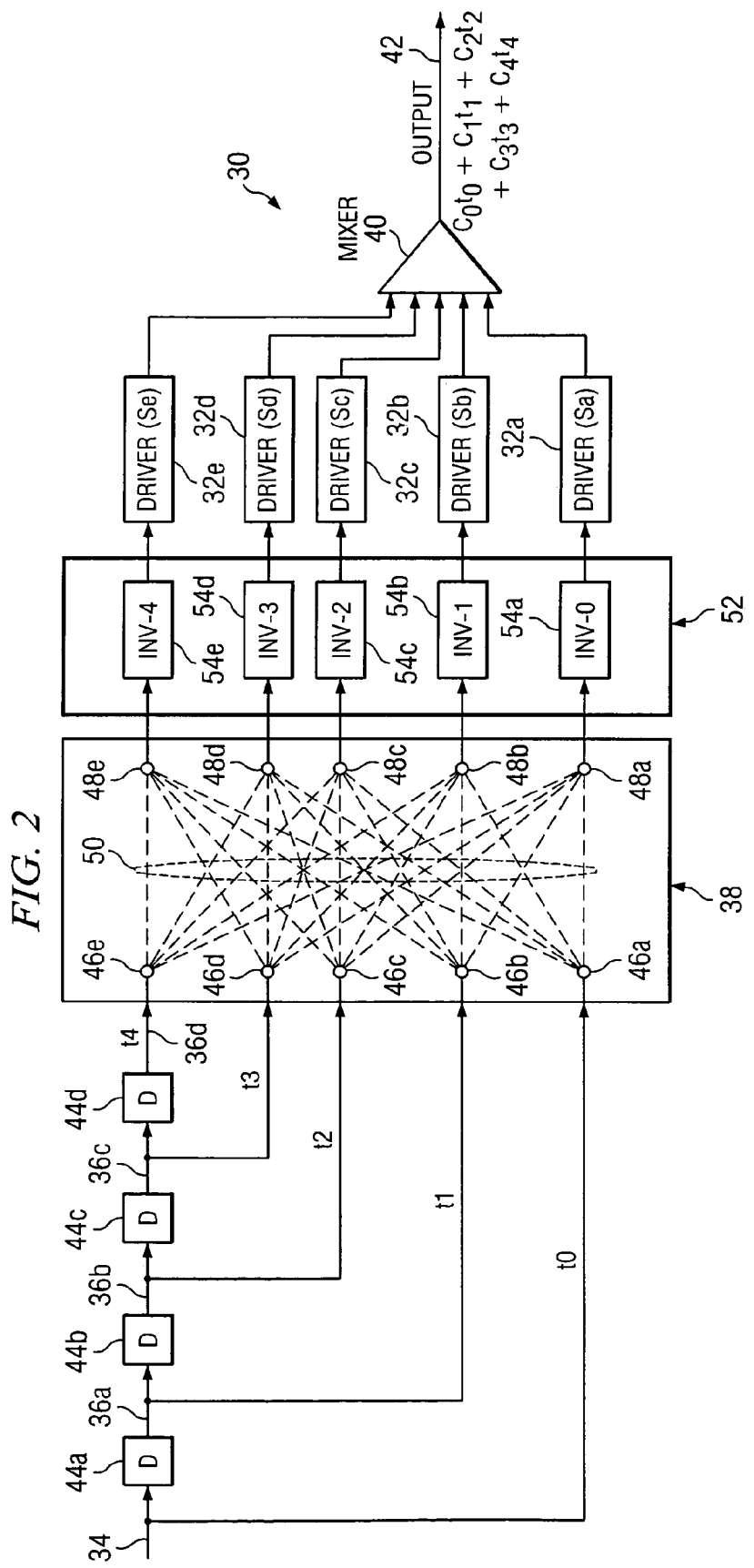
FIG. 2 illustrates one embodiment of an equalizing filter that distributes signals at individually sized drivers.

In various embodiments of the present invention, however, transmitter 24 includes an equalizing filter 30 that distributes signals at individually sized drivers. FIG. 2 illustrates one embodiment of an equalizing filter 30 for the efficient distribution of signals at a plurality of drivers 32. Specifically, equalizing filter 30 receives an incoming signal 34, which is indicated as $t_o$. In particular embodiments, incoming signal 34 may be of a digital format. Equalizing filter 30 performs a delay operation on incoming signal 34 to generate at least one delayed signal 36. Where incoming signal 34 is of a digital format, delayed signals 36 may also be of a digital format. Incoming signal 34 and delayed signals 36 are then routed to a switch 38 configured to distribute each signal to an individually sized driver 32. Drivers 32 reformat the signals so that the signals may be summed by a mixer 40 of equalizing filter 30 to generate an output signal 42. As described above, output signal 42 may be transmitted from equalizing filter 30 of network element 20a to receiver 26 of network element 20b through channel 22. Although FIG. 2 is illustrated as mixing a combination of five signals to generate a single high speed signal 42, the architecture illustrated in FIG. 2 is merely provided as one example of an embodiment of an equalizing filter 30. Any appropriate number of signals may be combined and mixed to generate a desired number of taps.

Delay circuits 44 perform a delay operation on incoming signal 34 to generate one or more delayed signals 36, which are delayed by, for example, a one bit time delay. Incoming signal 34 is transformed into segments $t_i$, where each segment comprises 'i' bit time delay of incoming signal 34. In the illustrated example, equalizing filter 30 includes four delay circuits 44a–d. Because each delay circuit 44a–d may be used to generate a delayed signal 36, equalizing filter 30 generates four delay signals 36a–36d, indicated as $t_{1-t4}$. Specifically, delay circuit 44a performs a delay on incoming signal 34 to generate first delayed signal 36a. First delayed signal 36a comprises bits that are common to incoming signal 34. The bits, however, are delayed by a desired amount. In particular embodiments, incoming signal 34 may be received from a 4-to-1 multiplexer and the rate of transmission of incoming signal 34 may be on the order of 3.125 GHz. In such an embodiment, first delayed signal 36a may be delayed by an amount on the order of 1UI, or 0.32 ns.

Delay circuit 44b performs a delay on first delayed signal 36a to generate second delayed signal 36b. Second delay signal 36b comprises one or more bits common to first delayed signal 36a, but the bits are delayed by a desired amount. For the above-described example, where incoming signal 34 and first delayed signal 36a have a rate of transmission on the order of 3.125 GHz, second delayed signal 36b may be delayed by an amount on the order of 2UI, or 0.64 ns. Delayed signals 36c–d are each generated in a similar manner. Specifically, a third delay circuit 44c may generate a third delayed signal 36c from second delayed signal 36b. In turn, a fourth delay circuit 44d may generate a fourth delayed signal 36d from third delayed signal 36c. Although equalizing filter 30 is described and illustrated as including four delay circuits 44a–d, however, it is recognized that equalizing filter 30 may include any desired number of delay circuits 44 for generating a desired number of delayed signals 36. As used in this document, "each" refers to each member of a set or each member of a subset of a set.

Incoming signal 34 and the generated delayed signals 36 are routed to a switch 38. Switch 38 includes a plurality of switch transmitters 46 and a plurality of switch receivers 48. In particular embodiments, each switch transmitter 46 may be coupled to every switch receiver 48 such that a signal path 50 is defined between each switch transmitter 46 and each switch receiver 48. Switch transmitters 46 and switch receivers 48 are configured to distribute incoming signal 34 and delayed signals 36 to individually sized drivers 32 via signal paths 50.

As will be described in greater detail below, switch 38 may identify a drive strength ($S_{a-e}$) associated with each driver 32. Switch transmitters 46 may determine where to route incoming signal 34 and delayed signals 36 based at least in part on the identified drive strengths ($S_{a-e}$) associated with drivers 32. Switch transmitters 46 may then transmit each incoming signal 34 and delayed signal 36 to the particular switch receiver 48 that is coupled to a selected driver 32 based at least in part on the drive strength ($S_{a-e}$) of the selected driver 32.

In certain embodiments, equalizing filter 30 may also include an array 52 of inverters 54 that receive incoming signals 34 and delayed signals 36 from switch 38. The number of inverters 54 in equalizing filter 30 may be related to the number of taps being used by equalizing filter 30 to compensate for distortion. In the illustrated example, equalizing filter 30 comprises a five tap filter. Accordingly, equalizing filter 30 is shown as including five inverters 54a–e. Each inverter 54 is configured to receive a signal transmitted from switch 38 and each inverter 54 is coupled to an associated driver 32. In operation, inverters 54 are configured to invert the polarity of received signals where the coefficient parameters associated with drivers 32 indicate that conversion is appropriate. The coefficient parameters may be positive or negative and are independent of one another. The number of coefficient parameters as equal to the number of taps of equalizing filter 30. The inversion function for equalizer 30 may be as follows:

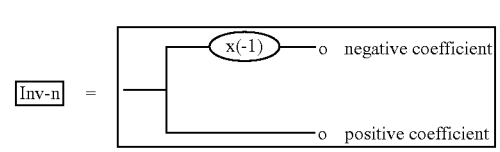

Thus, where the strength, or coefficient parameter, is negative, an inverter 54 receiving the signal may invert the polarity of the received signal. For example, if the coefficient parameter of driver 32a is negative, the polarity of the signal to be transmitted from inverter 54a is adjusted prior to transmission of the signal to driver 32a. On the other hand, if the strength, or coefficient parameter, of driver 32a is positive, the polarity of the signal to be transmitted from inverter 54a is not adjusted prior to transmission of the signal to driver 32a.

After leaving inverters 54, incoming signal 34 and delayed signals 36 are each transmitted to the particular driver 32 selected to receive the signals. In particular embodiments, drivers 32 include transistors that are configured to convert the received signals from a first format to a second format. For example, where incoming signal 34 and delayed signals 36 are of a digital format, drivers 32 include digital-to-analog converters. Accordingly, incoming signal 34 and delayed signals 36 may be received at drivers 32 as digital signals and be transmitted from drivers 32 as analog signals.

As discussed above, drivers 32 may be selected to receive the signals based at least in part on the drive strength ($S_{a-e}$) associated with each driver 32. In particular embodiments, the drive strengths ($S_{a-e}$) associated with each driver 32 includes a coefficient parameter that is based at least in part on the type of media used for data transmission. Thus, the coefficient parameters of drivers 32 are defined by the characteristics of transmission channel 22. The drive strengths are determined by the coefficient parameters.

After processing by drivers 32, incoming signal 34 and delayed signals 36 are transmitted to mixer 40. Mixer 40 sums incoming signal 32 and delayed signals 36 to generate output signal 42. In the illustrated example, output signal 42 comprises $C_0t_0+C_1t_1+C_2t_2+C_3t_3+C_4t_4$, where $C_i$ represents the coefficient parameters associated with drivers 32a–e. After summation of incoming signal 32 and delayed signals 36, output signal 42 may be transmitted through channel 22 to receiver 26.

Figure 3:
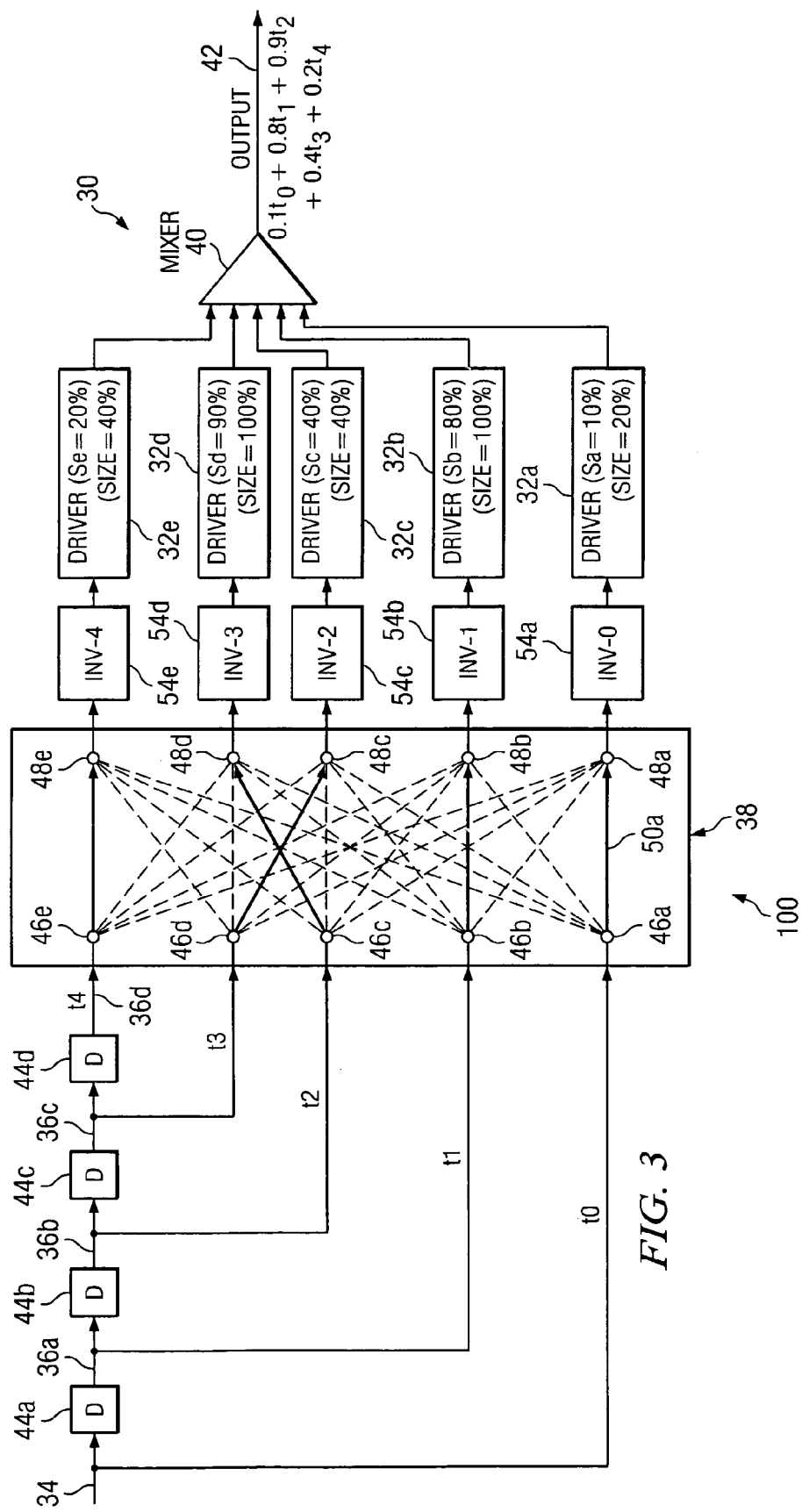
FIG. 3 illustrates one embodiment of an example distribution of signals using an equalizing filter.

FIG. 3 illustrates one embodiment of an example distribution 100 of signals using equalizing filter 30. Each driver 32 is configured based at least in part on two different parameters. First, each driver 32 has an associated device size. The device size is the hardware size and is fixed when the device is built. The device size associated with each driver 32 may be a percentage measurement of a real hardware device size. The second parameter associated with each driver 32a-3 includes strength ($S_i$). The strength of each driver 32a–e is determined when the operator of system 10 sets the coefficient parameters for each driver 32a–e in equalizer 30. The strength may be from 0 to X %, where X is limited by the driver size percentage of each tap.

Table 1 illustrates an example embodiment of equalizer 30 that includes assigned device sizes and driver strengths associated with each driver 32.

| Serial Data Input | Switch Matrix Output | Driver Size | Maximum Output Current | Output Strength Based on the Coefficient | Mixer Output |
|---|---|---|---|---|---|
| t0 | -> t0 | 40 µm^2 (20%) | 1.6 mA | 0.8 mA (10%) | 0.1t0 + |
| t1 | -> t1 | 200 µm^2 (100%) | 8 mA | 6.4 mA (80%) | 0.8 t1 + |
| t2 | ->t3 | 80 µm^2 (40%) | 3.2 mA | 3.2 mA (40%) | 0.4 t3 + |
| t3 | ->t2 | 200 µm^2 (100%) | 8 mA | 7.2 mA (90%) | 0.9 t2 + |
| t4 | ->t4 | 80 µm^2 (40%) | 3.2 mA | 1.6 mA (20%) | 0.2 t4 |

(total size = 600 µm^2)

In the example embodiment, the device size is expressed as a percentage of a real device size of 200 µm², and drivers 32a–e may have device sizes of 20%, 100%, 40%, 100%, and 40%, respectively. Accordingly, drivers 32a–e are the equivalent of 40, 200, 80, 200, and 80 µm² devices, respectively. As an example, the coefficient parameters ($C_0$, $C_1$, $C_2$, $C_3$, and $C_4$) are defined as 0.1, 0.8, 0.9, 0.4, and 0.2, respectively, for transmitter channel 22. Accordingly, the mixer output is $0.1t_0+0.8t_1+0.9t_2+0.4t_3+0.2t_4$. In order to realize this output by an equalizer 30 having the above-described example driver sizes, switch 38 swaps the signal routing for $t_2$ and $t_3$. Consequently, the strengths ($S_{a-e}$) of drivers 32a–e are set at 10%, 80%, 40%, 90%, and 20%, respectively, and represent the percentage of output current that each driver 32a–e may supply to output signal 42 when compared to a maximum output current. The maximum output current may be that which may be supplied by the individually sized drivers 32a–e. Since driver 32a has a strength of 10, driver 32a is configured to supply a maximum of 10% of the maximum output current. Similarly, since drivers 32b–e have strengths of 80, 40, 90, and 20, respectively, drivers 32b–e are configured to supply a maximum of 80%, 40%, 90%, and 20% of the maximum output current, respectively.

Because equalizer 30 operates with smaller sized drivers 32a–e, the total system size of equalizer 30 is reduced. The final output of equalizer 30, however, remains unchanged. Additionally, because incoming signal 34 and delayed signals 36 may be routed to the appropriately sized driver 32, the filter characteristics of equalizing filter 30 may remain unchanged. Even where the coefficient parameter is changed, each of signal 34 and signals 36a–d may be routed to the appropriate unequal-sized drivers 32a–3 by switch 38 based upon the strength of each driver 32a–e. Selecting appropriately sized drivers 32 independently of one another allows the total driver device size to be reduced. As a result, capacitance of the signals may be minimized, and the rate of transmission of output signal 42 may not be diminished.

Returning to FIG. 3, switch 38 directs each incoming signal 34 and delayed signal 36 to an individually sized driver 32. As illustrated, switch 38 has selected first driver 32a to receive incoming signal 34 ($t_0$). The selection of first driver 32a to receive incoming signal 34 is based at least in part by fitting the desired coefficient parameters to the maximum output current of each tap. The maximum output current is determined based at least in part on the size of each driver 32a–e on the drive strength associated with first driver 32a. For example, because first driver 32a is configured to output 6.4 mA or less, first switch transmitter 46a selects first driver 32a to receive incoming signal 34. Accordingly, first switch transmitter 46a routes incoming signal 34 to first switch receiver 48a, which is coupled, directly or indirectly, to first driver 32a.

As illustrated, switch 38 has distributed delayed signals 36a–d in a similar manner. Specifically, switch 38 has routed first delayed signal 36a to second driver 32b, second delayed signal 36b to fourth driver 32d, third delayed signal 36c to third driver 32c, and fourth delayed signal 36d to fifth driver 32e. The selection of the appropriate drivers 32 to receive delayed signals 36a–d is also based at least in part on the drive strength associated with each driver 32a–e.

As discussed above, drivers 32a–e transmit incoming signal 32 and delayed signals 36 to mixer 40, which sums the signals to generate output signal 42. Where the drive strengths associated with drivers 32a–e are set at 10%, 80%, 40%, 90%, and 20%, respectively, output signal 42 may comprise an analog signal equal to $0.1t_0+0.8t_1+0.9t_2+0.4t_3+0.2t_4$. Output signal 24 may be transmitted through channel 22 to receiver 26.

Figure 4:
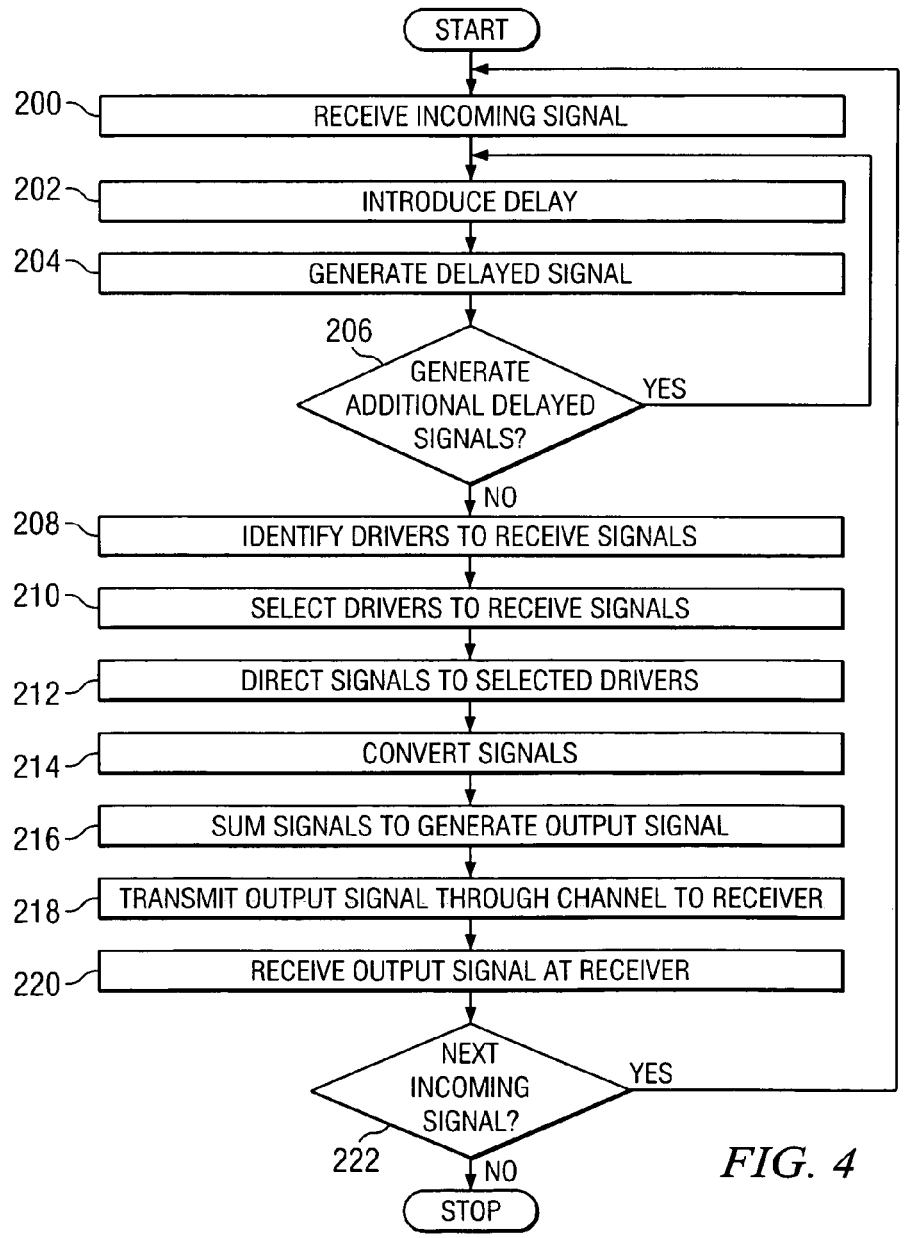
FIG. 4 illustrates a flowchart of one embodiment of a method for the efficient equalizing of data signals.

FIG. 4 illustrates a flowchart of one embodiment of a method for the efficient equalizing of data signals. The method begins at step 200, where equalizing filter 30 of transmitter 24 receives incoming signal 34. Equalizing filter 30 introduces a delay to the incoming signal at step 202. The introduction of the desired amount of delay may be performed by delays 54a. In particular embodiments, delays 54 may operate to introduce a delay into incoming signal 52 that is on the order of 1UI, or 0.32 ns. The introduction of the desired amount of delay into incoming signal 34 results in the generation of first delayed signal 36a at step 204.

At step 206, a determination is made as to whether additional delayed signals 36 are to be generated. Where additional delayed signals 36 are to be generated, the method returns to step 202 where a delay is introduced into first delayed signal 36a. The introduction of the delay into first delayed signal 36a generates an additional delayed signal 36b at step 204. The method may continue to cycle through steps 202–206 to generate additional delayed signals 36. In particular embodiments, and as illustrated in FIG. 3, four delayed signals 36a–d may be generated by equalizing filter 30. Each delay signal 36a–d may be delayed by a factor of 1UI, or 0.32 ns.

When it is determined at step 206 that additional delayed signals 36 are not to be generated, the method continues to step 208 where drivers 32 are identified to receive incoming signal 34 and delayed signals 36. As discussed above with regard to FIG. 3, each driver 32 may have an associated driver strength and driver size. In particular embodiments, the device size of each driver may be a function of the area of each driver 32 and may be on the order of 1 to 200 $\mu m^2$. The driver strength may represent a percentage of output current limited by the driver size of each tap.

At step 210, particular drivers 32 are selected to receive incoming signal 34 and delayed signals 36. For example, a first driver 34a may be selected to receive incoming signal 34, and a second driver 34b may be selected to receive first delayed signal 36a. In various embodiments, the selections are determined based at least in part by fitting the desired coefficient parameter to the maximum output current of each tap, which may be based on the size of each driver 32a–e. Additional drivers 32c–e may be selected to receive any additional delayed signals 34c–e, respectively, where delayed signals 34c–e are generated by equalizing filter 30.

Incoming signal 34 and delayed signals 36 may be directed to the selected drivers 32 at step 212.

In certain embodiments, the combinations of incoming signals 34 and delayed signals 36 may be inverted by an array 52 of inverters 54 before the signals are received at the selected drivers 32. Inverters 54 may operate to reverse the polarity of incoming signal 34 and delayed signals 36 where the coefficient parameters of the selected drivers 32 indicate that inversion is appropriate. The inverted signals may then be transmitted to the selected drivers 32 at step 212.

At step 214, incoming signal 34 and delayed signals 36 are converted from a first format to a second format. In particular embodiments, the conversion may be from a digital format to an analog format and may be performed by drivers 32. Accordingly, drivers 32 may comprise digital-to-analog converters. After conversion of incoming signal 34 and delayed signals 36, the signals may be summed at step 216. The summation of data signals 60 may be performed by mixer 62. In particular embodiments, the summation results in output signal 64, which comprises $C_0t_0+C_1t_1+C_2t_2+C_3t_3+C_4t_4$. For example, if the coefficient parameters ($C_0$, $C_1$, $C_2$, $C_3$, and $C_4$) of drivers 32a–e are set at 0.1, 0.8, 0.9, 0.4, and 0.2, respectively, output signal 42 may comprise an analog signal equal to $0.1t_0+0.8t_1+0.9t_2+0.4t_3+0.2t_4$.

At step 218, output signal 42 is transmitted through channel 22 to receiver 26. Receiver 26 receives output signal 42 at step 220. Receiver 26 processes output signal 42 in order to obtain a recovered data sequence from output signal 42. A determination is then made at equalizing filter 30 as to whether or not there are additional incoming signals 34 being received at equalizer 30 at step 222. If it is determined that equalizing filter 30 may receive additional incoming signals 34 at step 222, the method returns to step 200, where equalizing filter 30 receives additional incoming signals 34. If it is determined that equalizing filter 30 is not receiving additional incoming signals 34 at step 222, however, the method terminates.

Steps may be modified, added, or omitted without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:

1. A method for equalizing a signal, comprising:
   introducing a delay into an incoming data signal to generate a first delayed signal, the incoming data signal and the first delayed signal of a first format;
   identifying a plurality of drivers operable to receive the incoming signal and the first delayed signal, each of the plurality of drivers having an associated drive strength;
   selecting a first driver from the plurality of drivers to receive the incoming signal, the selection based at least in part on a comparison of the drive strength associated with the first driver to a maximum output current of the first driver;
   selecting a second driver from the plurality of drivers to receive the first delayed signal, the selection based at least in part on a comparison of the drive strength associated with the second driver to a maximum output current of the second driver;
   directing the incoming signal to the first driver; and
   directing the first delayed signal to the second driver.

2. The method of claim 1, wherein the drive strength associated with each of the plurality of drivers comprises a coefficient parameter.

3. The method of claim 2, wherein the coefficient parameter associated with each driver is defined by the type of media forming a channel for transmitting the signal, each driver comprising a transistor that is appropriately sized to define a maximum output current associated with the particular driver.

4. The method of claim 3, wherein the type of media comprises a cable on the order of 10 to 20 meters.

5. The method of claim 1, further comprising converting the incoming signal and the first delayed signal from the first format to a second format for data transmission.

6. The method of claim 5, wherein the first format is digital and the second format is analog.

7. The method of claim 5, further comprising summing the incoming signal of the second format and the first delayed signal of the second format to generate an output signal for data transmission.

8. The method of claim 1, further comprising:
introducing the delay into the first delayed signal to generate a second delayed signal;
selecting a third driver from the plurality of drivers to receive the second delayed signal, the selection based at least in part on a comparison of the drive strength associated with the third driver to a maximum output current of the third driver; and
directing the second delayed signal to the third driver.

9. The method of claim 8, further comprising:
introducing the delay into the second delayed signal to generate a third delayed signal;
selecting a fourth driver from the plurality of drivers to receive the third delayed signal, the selection based at least in part on a comparison of the drive strength associated with the fourth driver to a maximum output current of the fourth driver; and
directing the third delayed signal to the fourth driver.

10. The method of claim 9, further comprising:
introducing the delay into the third delayed signal;
selecting a fifth driver from the plurality of drivers to receive the fourth delayed signal, the selection based at least in part on a comparison of the drive strength associated with the fifth driver to a maximum output current of the fifth driver; and
directing the fourth delayed signal to the fifth driver.

11. A system for equalizing a signal, comprising:
a delay module operable to introduce a delay into an incoming signal to generate a first delayed signal, the incoming signal and the first delayed signal of a first format;
a switch operable to:
identify a plurality of drivers operable to receive the incoming signal and the first delayed signal, each of the plurality of drivers having an associated drive strength;
select a first driver from the plurality of drivers to receive the incoming signal, the selection based at least in part on a comparison of the drive strength associated with the first driver to a maximum output current of the first driver;
select a second driver from the plurality of drivers to receive the first delayed signal, the selection based at least in part on a comparison of the drive strength associated with the second driver to a maximum output current of the second driver;
direct the incoming signal to the first driver; and
direct the first delayed signal to the second driver.

12. The system of claim 11, wherein the drive strength associated with each of the plurality of drivers comprises a coefficient parameter.

13. The system of claim 12, wherein the coefficient parameter associated with each driver is defined by the type of media forming a channel for transmitting the signal, each driver comprising a transistor that is appropriately sized to define a maximum output current associated with the particular driver.

14. The system of claim 13, wherein the type of media comprises a cable on the order of 10 to 20 meters.

15. The system of claim 11, wherein the plurality of drivers are operable to convert the incoming signal and the first delayed signal from the first format to a second format for data transmission.

16. The system of claim 15, wherein the first format is digital and the second format is analog.

17. The system of claim 16, wherein the system further comprises a mixer operable to sum the incoming signal of the second format and the first delayed signal of the second format to generate an output signal for data transmission.

18. The system of claim 11, wherein:
the delay module comprises a first delay circuit operable to introduce the delay into the first delayed signal to generate a second delayed signal; and
the switch is further operable to:
select a third driver from the plurality of drivers to receive the second delayed signal, the selection based at least in part on a comparison of the drive strength associated with the third driver to a maximum output current of the third driver; and
direct the second delayed signal to the third driver.

19. The system of claim 18, wherein:
the delay module further comprises a second delay circuit operable to introduce the delay into the second delayed signal to generate a third delayed signal; and
the switch is further operable to:
select a fourth driver from the plurality of drivers to receive the third delayed signal, the selection based at least in part on a comparison of the drive strength associated with the fourth driver to a maximum output current of the fourth driver; and
direct the third delayed signal to the fourth driver.

20. The system of claim 19, wherein:
the delay module further comprises a third delay circuit operable to introduce the delay into the third delayed signal; and
the switch is further operable to:
select a fifth driver from the plurality of drivers to receive the fourth delayed signal, the selection based at least in part on a comparison of the drive strength associated with the fifth driver to a maximum output current of the fifth driver; and
direct the fourth delayed signal to the fifth driver.

21. Logic for equalizing a signal, the logic embodied in a medium and operable to:
introduce a delay into an incoming data signal to generate a first delayed signal, the incoming data signal and the first delayed signal of a first format;
identify a plurality of drivers operable to receive the incoming signal and the first delayed signal, each of the plurality of drivers having an associated drive strength;
select a first driver from the plurality of drivers to receive the incoming signal, the selection based at least in part on a comparison of the drive strength associated with the first driver to an output current of the first driver;

select a second driver from the plurality of drivers to receive the first delayed signal, the selection based at least in part on a comparison of the drive strength associated with the second driver to an output current of the second driver;
direct the incoming signal to the first driver; and
direct the first delayed signal to the second driver.

22. The logic of claim 21, wherein the drive strength associated with each of the plurality of drivers comprises a coefficient parameter.

23. The logic of claim 22, wherein the coefficient parameter associated with each driver is defined by the type of media forming a channel for transmitting the signal, each driver comprising a transistor that is appropriately sized to define a maximum output current associated with the particular driver.

24. The logic of claim 23, wherein the type of media comprises a cable on the order of 10 to 20 meters.

25. The logic of claim 21, further operable to convert the incoming signal and the first delayed signal from the first format to a second format for data transmission.

26. The logic of claim 25, wherein the first format is digital and the second format is analog.

27. The logic of claim 26, further operable to sum the incoming signal of the second format and the first delayed signal of the second format to generate an output signal for data transmission.

28. The logic of claim 21, further operable to:
introduce the delay into the first delayed signal to generate a second delayed signal;
select a third driver from the plurality of drivers to receive the second delayed signal, the selection based at least in part on the a comparison of drive strength associated with the third driver to a maximum output current of the third driver; and
direct the second delayed signal to the third driver.

29. The logic of claim 28, further operable to:
introduce the delay into the second delayed signal to generate a third delayed signal;
select a fourth driver from the plurality of drivers to receive the third delayed signal, the selection based at least in part on a comparison of the drive strength associated with the fourth driver; and
direct the third delayed signal to the fourth driver.

30. The logic of claim 29, further operable to:
introduce the delay into the third delayed signal;
select a fifth driver from the plurality of drivers to receive the fourth delayed signal, the selection based at least in part on a comparison of the drive strength associated with the fifth driver to a maximum output current of the fifth driver; and
direct the fourth delayed signal to the fifth driver.

31. A system for equalizing a signal, comprising:
means for introducing a delay into an incoming data signal to generate a first delayed signal, the incoming data signal and the first delayed signal of a first format;
means for identifying a plurality of drivers operable to receive the incoming signal and the first delayed signal, each of the plurality of drivers having an associated drive strength;
means for selecting a first driver from the plurality of drivers to receive the incoming signal, the selection based at least in part on a comparison of the drive strength associated with the first driver to a maximum output current of the first driver;
means for selecting a second driver from the plurality of drivers to receive the first delayed signal, the selection based at least in part on a comparison of the drive strength associated with the second driver to a maximum output current of the second driver;
means for directing the incoming signal to the first driver; and
means for directing the first delayed signal to the second driver.

32. A method for equalizing a signal, comprising:
introducing a delay into an incoming data signal to generate a first delayed signal, the incoming data signal and the first delayed signal of a first format;
introducing the delay into the first delayed signal to generate a second delayed signal of the first format;
introducing the delay into the second delayed signal to generate a third delayed signal of the first format;
introducing the delay into the third delayed signal to generate a fourth delayed signal of the first format;
identifying a plurality of drivers operable to receive the incoming signal and the first, second, third, and fourth delayed signals, each of the plurality of drivers having an associated drive strength;
selecting a first driver from the plurality of drivers to receive the incoming signal, the selection based at least in part on a comparison of the drive strength associated with the first driver to a maximum output current of the first driver;
selecting a second driver from the plurality of drivers to receive the first delayed signal, the selection based at least in part on a comparison of the drive strength associated with the second driver to a maximum output current of the second driver;
selecting a third driver from the plurality of drivers to receive the second delayed signal, the selection based at least in part on a comparison of the drive strength associated with the third driver to a maximum output current of the third driver;
selecting a fourth driver from the plurality of drivers to receive the third delayed signal, the selection based at least in part on a comparison of the drive strength associated with the fourth driver to a maximum output current of the fourth driver;
selecting a fifth driver from the plurality of drivers to receive the fourth delayed signal, the selection based at least in part on a comparison of the drive strength associated with the fifth driver to a maximum output current of the fifth driver;
directing the incoming signal to the first driver;
directing the first delayed signal to the second driver;
directing the second delayed signal to the third driver;
directing the third delayed signal to the fourth driver;
directing the fourth delayed signal to the fifth driver; and
converting the incoming signal and the first, second, third, and fourth delayed signals to a second format for data transmission.

* * * * *